(12) United States Patent
Kubota et al.

(10) Patent No.: US 10,620,652 B2
(45) Date of Patent: Apr. 14, 2020

(54) POWER MANAGEMENT DEVICE

(71) Applicant: TOSHIBA MITSUBISHI-ELECTRIC INDUSTRIAL SYSTEMS CORPORATION, Tokyo (JP)

(72) Inventors: Kei Kubota, Tokyo (JP); Hiroyuki Imanari, Tokyo (JP)

(73) Assignee: TOSHIBA MITSUBISHI-ELECTRIC INDUSTRIAL SYSTEMS CORPORATION, Tokyo (JP)

(*) Notice: Subject to any disclaimer, the term of this patent is extended or adjusted under 35 U.S.C. 154(b) by 148 days.

(21) Appl. No.: 14/894,714

(22) PCT Filed: May 30, 2013

(86) PCT No.: PCT/JP2013/065067
§ 371 (c)(1),
(2) Date: Nov. 30, 2015

(87) PCT Pub. No.: WO2014/192119
PCT Pub. Date: Dec. 4, 2014

(65) Prior Publication Data
US 2016/0124450 A1 May 5, 2016

(51) Int. Cl.
*G05F 1/66* (2006.01)
*H02J 3/28* (2006.01)
(Continued)

(52) U.S. Cl.
CPC ............ *G05F 1/66* (2013.01); *G05B 13/026* (2013.01); *H02J 3/28* (2013.01); *H02J 15/003* (2013.01); *Y02E 60/17* (2013.01); *Y02P 90/50* (2015.11)

(58) Field of Classification Search
CPC .. G05F 1/66; G05B 13/026; H02J 3/28; H02J 15/003; Y02P 90/50; Y02E 60/17
(Continued)

(56) References Cited

U.S. PATENT DOCUMENTS 6,346,670 B1* 2/2002 Fujii .................... H02J 7/35
136/244
7,633,284 B2* 12/2009 Ingram ................ H02J 7/0019
320/167
(Continued)

FOREIGN PATENT DOCUMENTS

CN 102510123 A 6/2012
CN 102855343 A 1/2013
(Continued)

OTHER PUBLICATIONS

International Search Report dated Dec. 24, 2013, in PCT/JP2013/065067 filed May 30, 2013.
(Continued)

*Primary Examiner* — Christopher E. Everett
*Assistant Examiner* — Mohammed Shafayet
(74) *Attorney, Agent, or Firm* — Xsensus LLP

(57) ABSTRACT

A power management device managing electric power in a load facility group including plural load facilities includes: a detector that detects an instantaneous value of power consumption for each of the plural load facilities; a forecaster that forecasts an instantaneous value of power consumption for each of the plural load facilities; an operation unit that obtains a difference between the value detected by the detector and the value forecasted by the forecaster, for each of the plural load facilities; a controller that outputs a storage command or a discharge command based on whether the difference obtained by the operation unit is positive or negative; and a storage/discharge device that stores/discharges electricity based on the storage command or the discharge command output by the controller. The power management device can respond to instantaneous and steep power consumption amount change in a load facility to enable efficient use of power.

6 Claims, 3 Drawing Sheets

(51) Int. Cl.
  *H02J 15/00* (2006.01)
  *G05B 13/02* (2006.01)
(58) Field of Classification Search
  USPC .......................................................... 700/291
  See application file for complete search history.

(56) References Cited

U.S. PATENT DOCUMENTS

| | | | | |
|---|---|---|---|---|
| 9,368,968 | B2* | 6/2016 | Schrock | H02J 3/28 |
| 2004/0102937 | A1* | 5/2004 | Ibrahim | G05B 13/048 |
| | | | | 703/2 |
| 2007/0288774 | A1* | 12/2007 | Tanaka | G06F 1/3209 |
| | | | | 713/300 |
| 2009/0077399 | A1* | 3/2009 | Noda | G03G 15/5004 |
| | | | | 713/320 |
| 2009/0171511 | A1* | 7/2009 | Tolentino | G06F 1/266 |
| | | | | 700/297 |
| 2010/0076613 | A1* | 3/2010 | Imes | G06Q 50/06 |
| | | | | 700/287 |
| 2010/0264874 | A1* | 10/2010 | Murtha | H02J 7/0003 |
| | | | | 320/110 |
| 2010/0306027 | A1* | 12/2010 | Haugh | G06Q 10/04 |
| | | | | 705/7.36 |
| 2011/0231026 | A1* | 9/2011 | Yaoyama | G03G 15/5004 |
| | | | | 700/291 |
| 2011/0231028 | A1* | 9/2011 | Ozog | G06Q 10/06 |
| | | | | 700/291 |
| 2011/0238232 | A1* | 9/2011 | Tomita | H02J 3/32 |
| | | | | 700/291 |
| 2012/0036377 | A1* | 2/2012 | Tolentino | G06F 1/266 |
| | | | | 713/310 |
| 2012/0049625 | A1* | 3/2012 | Hopwood | E21B 3/00 |
| | | | | 307/32 |
| 2012/0059527 | A1* | 3/2012 | Beaston | H01M 10/441 |
| | | | | 700/295 |
| 2012/0066439 | A1* | 3/2012 | Fillingim | G06F 11/3485 |
| | | | | 711/103 |
| 2012/0083927 | A1* | 4/2012 | Nakamura | G05B 13/026 |
| | | | | 700/278 |
| 2012/0084063 | A1* | 4/2012 | Drees | G06Q 10/06 |
| | | | | 703/6 |
| 2012/0330472 | A1* | 12/2012 | Boot | G06Q 50/06 |
| | | | | 700/291 |
| 2013/0020871 | A1* | 1/2013 | Takehara | H02J 3/14 |
| | | | | 307/32 |
| 2013/0079939 | A1* | 3/2013 | Darden, II | G06Q 10/063 |
| | | | | 700/291 |
| 2013/0080805 | A1* | 3/2013 | Vick | G06F 8/4432 |
| | | | | 713/320 |
| 2013/0082640 | A1* | 4/2013 | Nishibayashi | H02J 3/32 |
| | | | | 320/106 |
| 2013/0116842 | A1* | 5/2013 | Saito | H02J 13/00 |
| | | | | 700/291 |
| 2013/0154570 | A1* | 6/2013 | Nomura | H02J 3/32 |
| | | | | 320/128 |
| 2013/0158732 | A1* | 6/2013 | Kritt | G06Q 10/063 |
| | | | | 700/291 |
| 2013/0158733 | A1* | 6/2013 | Kritt | G06Q 50/06 |
| | | | | 700/291 |
| 2013/0178991 | A1* | 7/2013 | Gheerardyn | G05B 13/02 |
| | | | | 700/286 |
| 2013/0178993 | A1* | 7/2013 | Rombouts | G05B 13/02 |
| | | | | 700/291 |
| 2013/0187613 | A1* | 7/2013 | Tonegawa | B60L 11/1844 |
| | | | | 320/128 |
| 2013/0218358 | A1* | 8/2013 | Yamada | H02J 3/14 |
| | | | | 700/292 |
| 2013/0261823 | A1* | 10/2013 | Krok | G05F 5/00 |
| | | | | 700/291 |
| 2014/0129040 | A1* | 5/2014 | Emadi | G06Q 50/06 |
| | | | | 700/291 |
| 2014/0229026 | A1* | 8/2014 | Cabrini | G06O 50/06 |
| | | | | 700/291 |
| 2014/0361745 | A1* | 12/2014 | Nishita | H02J 7/041 |
| | | | | 320/109 |
| 2015/0051745 | A1* | 2/2015 | Imanari | H02J 3/32 |
| | | | | 700/291 |
| 2015/0122589 | A1* | 5/2015 | Mezzadri | B66B 1/306 |
| | | | | 187/290 |

FOREIGN PATENT DOCUMENTS

| | | |
|---|---|---|
| CN | 103106541 A | 5/2013 |
| JP | 9-182295 | 7/1997 |
| JP | 11-41831 | 2/1999 |
| JP | 2011-193639 A | 9/2011 |
| JP | 2012-100509 | 5/2012 |
| JP | 2013-99140 | 5/2013 |

OTHER PUBLICATIONS

Taiwanese Office Action dated Jun. 3, 2015, in Taiwan Patent Application 102129984, with Partial English Translation.
Office Action dated Jan. 17, 2017 in Japanese Patent Application No. 2015-519562 (with Partial English translation).
Chinese Office Action dated Jul. 18, 2017 in Chinese Patent Application No. 201380076973.7 (with unedited computer generated English translation).
Office Action dated Mar. 29, 2018 in Chinese Patent Application No. 201380076973.7 (with English language translation).
Office Action issued in Brazillian Application BR 11 2015 029424-3 A2 dated Dec. 17, 2019.

* cited by examiner

1: LOAD FACILITIES
2: POWER DETECTION UNIT
3: POWER FORECASTING UNIT
4: DIFFERENCE OPERATION UNIT
5: STORAGE FACILITY CONTROL UNIT
   REGENERATIVE ENERGY CONTROL UNIT
6: STORAGE/DISCHARGE DEVICE
7: STORAGE UNIT
8: DISPLAY UNIT
9: LEARNING FUNCTION UNIT

S11: POWER FORECASTING UNIT
FORECASTED VALUE CALCULATION/TRANSMISSION
S12: TRANSMISSION Y/N?
S21: POWER DETECTION UNIT
ACTUAL MEASURED VALUE DETECTION/TRANSMISSION
S22: TRANSMISSION Y/N?
S30: COMPARISON OPERATION OF
DIFFERENCE VALUE = FORECASTED VALUE − ACTUAL RESULT VALUE
S31: DIFFERENCE VALUE?
S34: TRANSMISSION Y/N?

US 10,620,652 B2

POWER MANAGEMENT DEVICE

TECHNICAL FIELD

The present invention relates to a power management device.

BACKGROUND ART

As a conventional power management device, one including a power consumption-related information obtainment unit that obtains power consumption-related information including information on an event that affects demand control for a building that is a monitoring target, information on an environment when a demand value exceeded contracted power in the past, information on a forecast of a weather condition and electricity regulation information; a demand forecast calculation unit that based on the power consumption-related information obtained by the power consumption-related information obtainment unit, calculates demand forecast information; and an apparatus control unit that based on the demand forecast information calculated by the demand forecast calculation unit, determines an apparatus to be subjected to operation control and transmits a content of control of the apparatus to a server for management of building information to be viewed by a user of the building, the server being connected to the power management device, is known (see, for example, Patent Literature 1).

CITATION LIST

Patent Literature

Patent Literature 1: Japanese Patent Laid-Open No. 2011-193639

SUMMARY OF INVENTION

Technical Problem

In particular, where a load facility that is a demand control target is, for example, an apparatus in a plant such as a hot rolling plant, power consumption in the load facility may instantaneously undergo steep change attributable to, e.g., production condition change, occurrence of an abnormality during operation or regenerative electric power generated from the load facility.

However, the conventional power management device indicated in Patent Literature 1 does not at all consider instantaneous and steep power consumption change in a load facility attributable to, e.g., production condition change, occurrence of an abnormality during operation or regenerative electric power generated from the load facility. In particular, e.g., occurrence of an abnormality during operation is difficult to predict in advance, and thus may cause a demand forecast to be significantly deviated from an actual result. Such deviation of demand forecasts from actual results may ultimately cause an overrun in contracted power amount.

Also, an increase in contracted power amount to provide a large safety margin in preparation for instantaneous and steep power consumption change in a load facility may cause an economic disadvantage and/or deterioration in energy use efficiency.

The present invention has been made in order to solve such problem, and is intended to provide a power management device that can properly respond to instantaneous and steep power consumption amount change in a load facility and enables efficient use of power.

Means for Solving the Problems

A power management device according to the present invention, which is for managing electric power in a load facility group having a plurality of load facilities, includes: a detection unit configured to detect an instantaneous value of power consumption for each of the plurality of load facilities; a forecasting unit configured to forecast an instantaneous value of power consumption for each of the plurality of load facilities; an operation unit configured to perform an operation to obtain a difference between the value detected by the detection unit and the value forecasted by the forecasting unit, for each of the plurality of load facilities; a control unit configured to output a storage command or a discharge command based on whether the difference obtained by the operation unit is positive or negative; and a storage/discharge device configured to store or discharge electricity based on the storage command or the discharge command output from the control unit.

Advantageous Effect of Invention

A power management device according to the present invention provides the effect of being able to properly respond to instantaneous and steep power consumption amount change in a load facility and enabling efficient use of power.

DESCRIPTION OF EMBODIMENT

Figure 1:
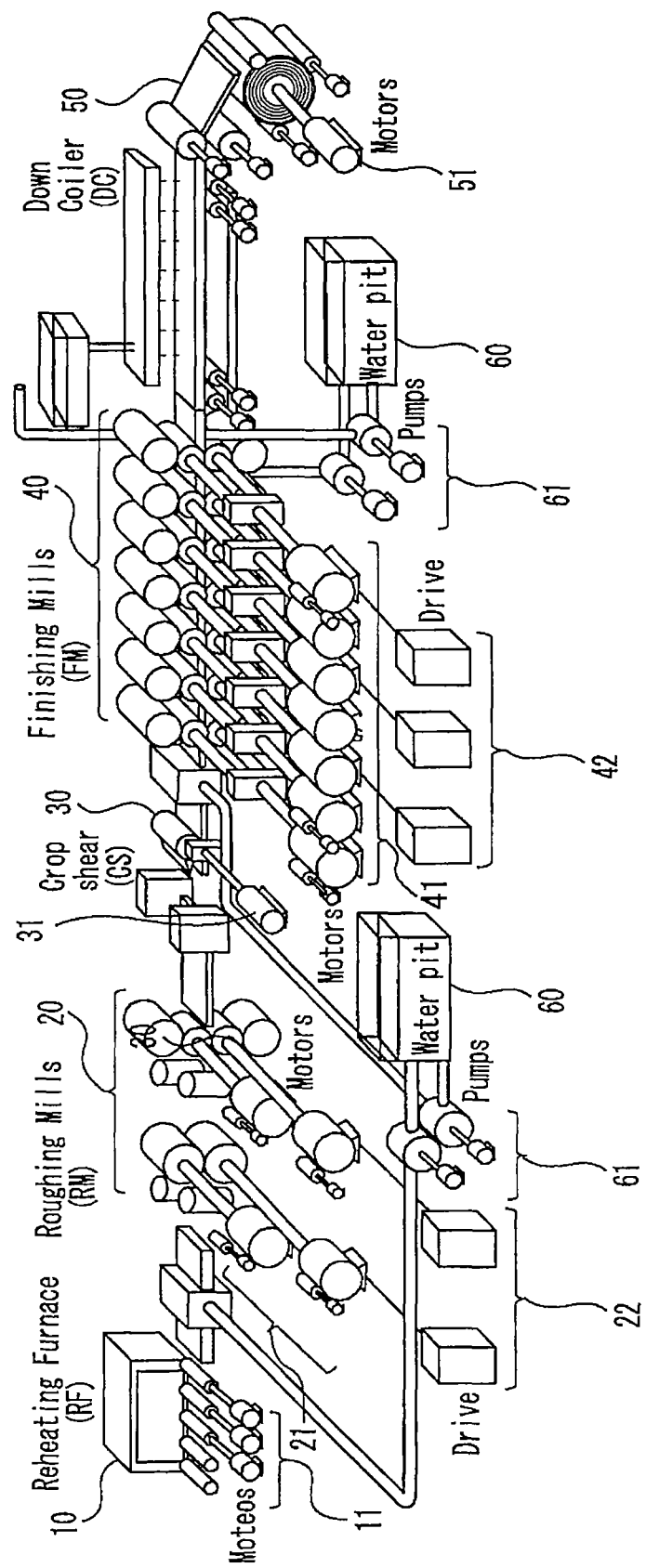
FIG. 1 is a diagram illustrating a configuration of a hot rolling plant to which a power management device which is related to Embodiment 1 of the present invention is applied.

The present invention will be described with reference to the attached drawings. Through the drawings, same reference numerals indicate parts that are identical or correspond to each other, and overlapping description thereof will arbitrarily be simplified or omitted.

Embodiment 1

Figure 2:
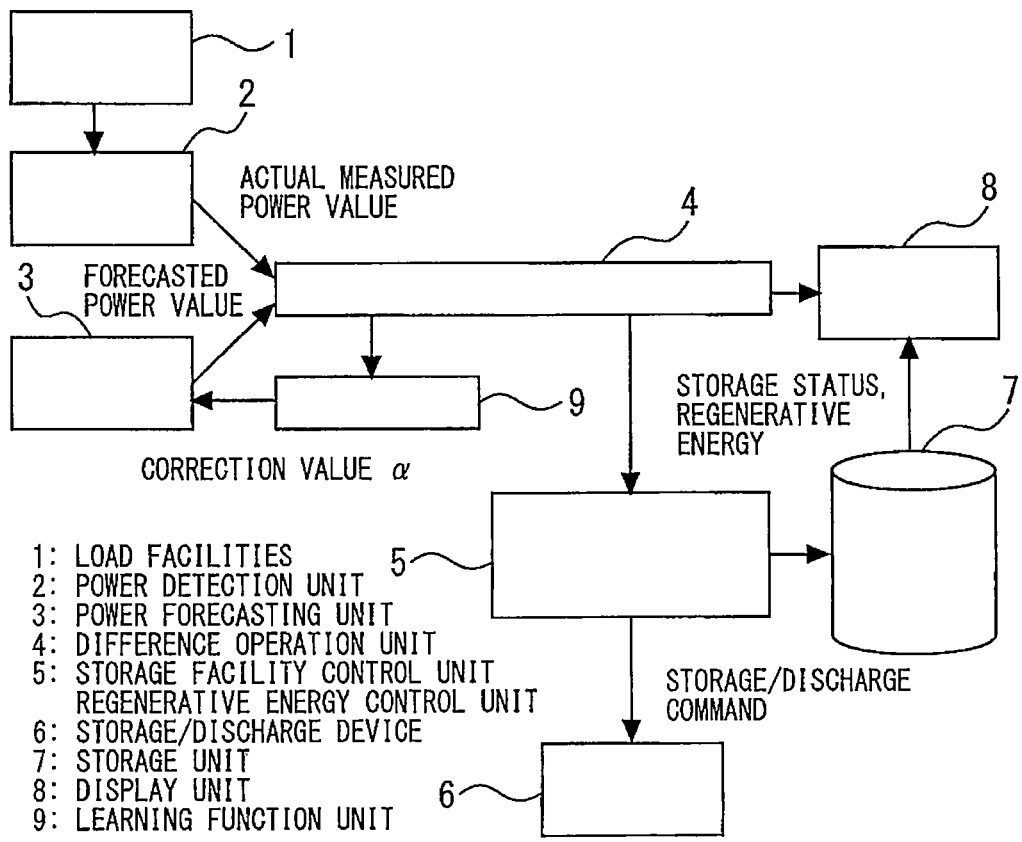
FIG. 2 is a block diagram schematically illustrating an overall configuration of the power management device related to Embodiment 1 of the present invention.
Figure 3:
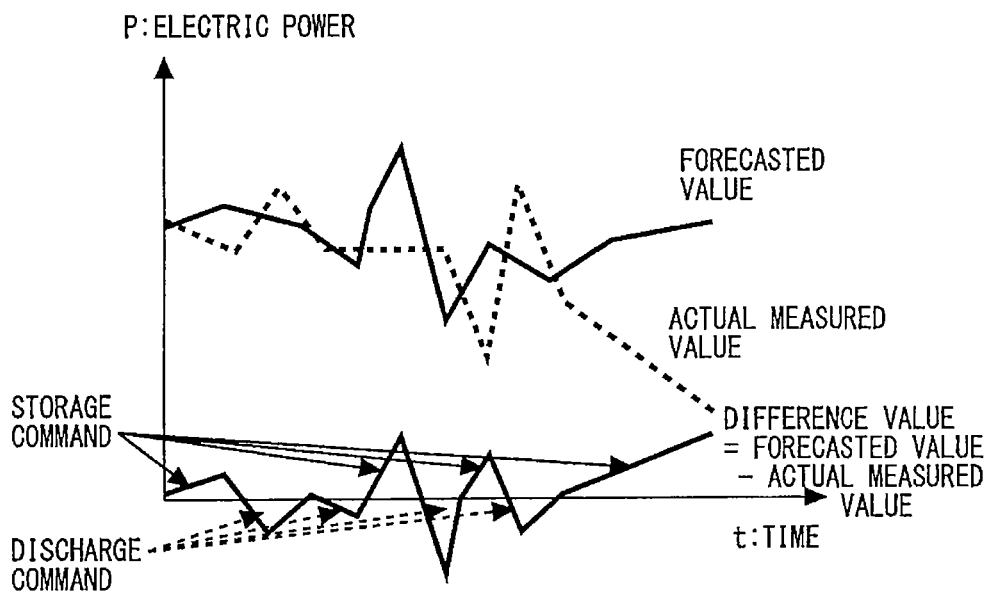
FIG. 3 is a diagram illustrating a relationship between a difference between actual measured value and forecasted value of power consumption in a load facility and storage commands/discharge commands output from a storage/discharge device control unit in the power management device related to Embodiment 1 of the present invention.
Figure 4:
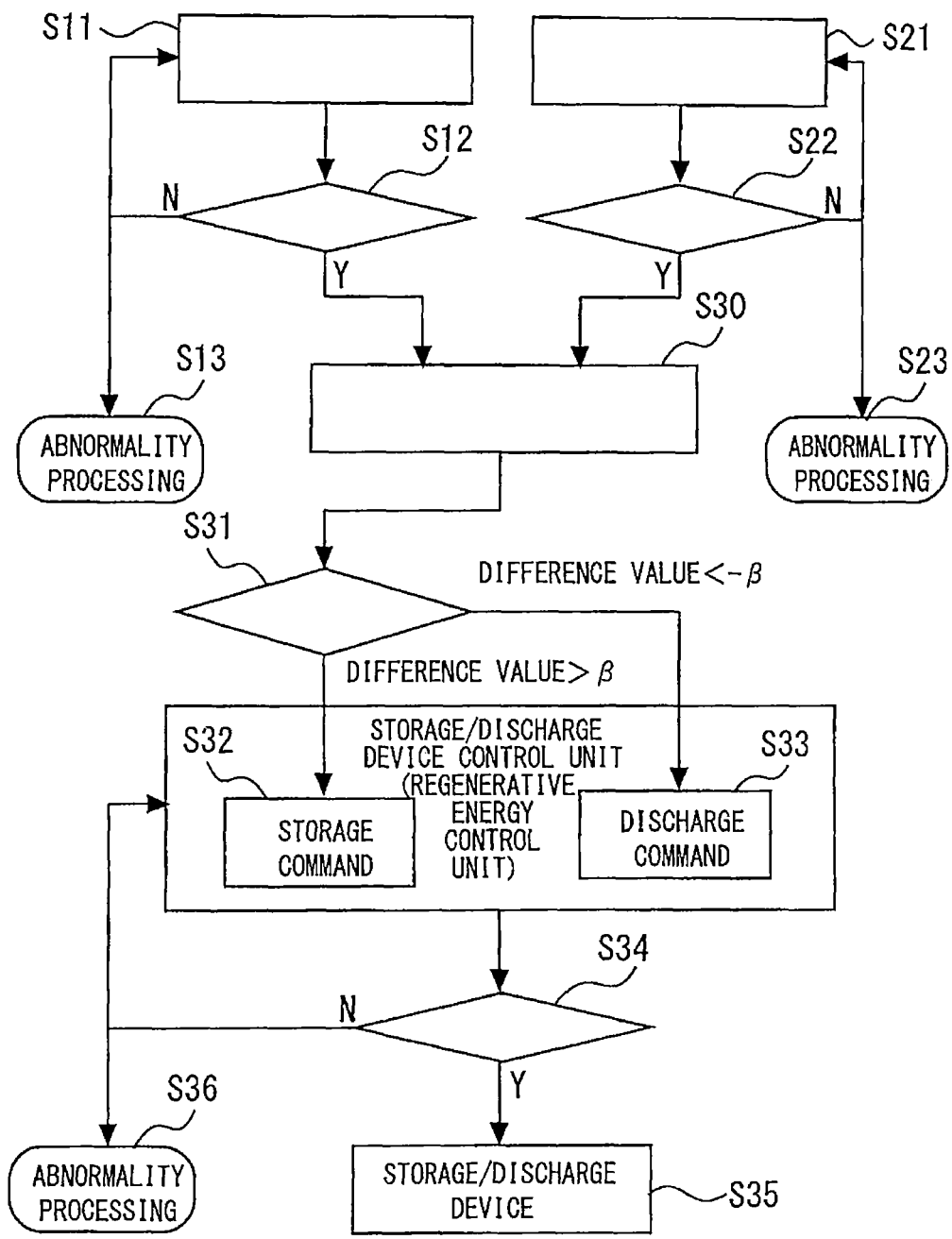
FIG. 4 is a diagram illustrating operation of the power management device related to Embodiment 1 of the present invention.

FIGS. 1 to 4 relate to Embodiment 1 of the present invention: FIG. 1 is a diagram illustrating a configuration of a hot rolling plant to which a power management device is applied; FIG. 2 is a block diagram schematically illustrating an overall configuration of the power management device; FIG. 3 is a diagram illustrating a relationship between a difference between actual measured value and forecasted value of power consumption in a load facility and storage commands/discharge commands output from a storage/discharge device control unit in the power management device; and FIG. 4 is a diagram illustrating operation of the power management device.

In FIG. 1, on the exit side of a reheating furnace 10 (RF) that extracts a rolling material, roughing mills 20 (RM) are arranged. On the exit side of the roughing mills 20, a crop shear 30 (CS) is arranged. On the exit side of the crop shear 30, finishing mills 40 (FM) are arranged. On the exit side of the finishing mills 40, a down coiler 50 (DC) is arranged.

A rolling material extracted by the reheating furnace 10 is first rolled by the roughing mills 20. After the rolling via the roughing mills 20, waste at a front end and a tail end of the steel plate (rolling material) is sheared by the crop shear 30. Subsequently, the finishing mills 40 roll the rolling material to a product thickness. Subsequently, the down coiler 50 takes the rolling material up into a coiled form.

The reheating furnace 10 is driven by motive power of a reheating furnace motor 11. The rolling operation of the roughing mills 20 is performed using a roughing mill motor 21 as a motive power source. The roughing mill motor 21 is driven by a roughing mill drive device 22. The roughing mill drive device 22 adjusts electric power to be supplied to the roughing mill motor 21, thereby controlling operation of the roughing mill motor 21.

A motive power source of the crop shear 30 is a crop shear motor 31. The rolling operation of the finishing mills 40 is performed using a finishing mill motor 41 as a motive power source. The finishing mill motor 41 is driven by a finishing mill drive device 42. The finishing mill drive device 42 adjusts electric power to be supplied to the finishing mill motor 41, thereby controlling operation of the finishing mill motor 41.

A motive power source of the down coiler 50 is a down coiler motor 51. Here, in the above hot rolling process, the rolling material is properly cooled by a cooling device at each of positions where the cooling is necessary. In order to supply cooling water to the cooling device, a water pit 60 and a pump 61 are installed.

In the hot rolling plant configured as described above, the reheating furnace motor 11, the roughing mill motor 21, the crop shear motor 31, the finishing mill motor 41, the down coiler motor 51 and the pump 61 are load facilities 1 that consume electric power for operation of the plant. A plurality of each of these load facilities 1 are provided. These load facilities 1 are divided into load facility groups each including a plurality of load facilities 1. A plurality of each of the load facility groups may be provided.

More specifically, in FIG. 1, a plurality of reheating furnace motors 11 are provided. The plurality of reheating furnace motors 11 form one load facility group. A plurality of roughing mill motors 21 form one load facility group. A plurality of finishing mill motors 41 form one load facility group, and also a plurality of pumps 61 form one load facility group.

A power management device that manages electric power to be supplied to the plurality of the load facilities 1 (load facility groups) provided as described above is configured as illustrated in FIG. 2. In FIG. 2, for each of the plurality of load facilities 1, an instantaneous value of actually-consumed electric power is detected by a power detection unit 2. A power forecasting unit 3 forecasts an instantaneous value of power consumption for each of the plurality of load facilities 1.

An instantaneous value (actual measured value) of power consumption in each load facility 1, which has been detected by the power detection unit 2, is input to a difference operation unit 4. Also, an instantaneous value (forecasted value) of power consumption for each load facility 1, which has been forecasted by the power forecasting unit 3, is input to the difference operation unit 4. The difference operation unit 4 performs an operation to obtain a difference between the actual measured value detected by the power detection unit 2 and the forecasted value forecasted by the power forecasting unit 3 for each of the load facilities 1. Here, the difference operation unit 4 performs an operation to obtain the difference value by subtracting the actual measured value provided by the power detection unit 2 from the forecasted value provided by the power forecasting unit 3. In other words, for each of the load facilities 1, (difference value)=(forecasted value)−(actual measured value).

The difference value obtained by the difference operation unit 4 is input to a storage/discharge device control unit 5. The storage/discharge device control unit 5 is intended to control electricity storage operation and electricity discharge operation of the storage/discharge device 6. The storage/discharge device 6 includes a secondary battery or a capacitor that can store and discharge electricity. The storage/discharge device 6 is installed for each load facility group.

Also, a facility (hot rolling plant) to which the power management device according to the present embodiment is applied is equipped with a non-illustrated power supply device that supplies electric power to each of the load facilities 1. Each load facility 1 is driven by the electric power supplied from the power supply device and electric power supplied from the storage/discharge device 6, which is provided for each load facility group. The amount of electric power supplied from the power supply device to a certain load facility 1 is secured based on the forecasted power consumption value forecasted by the power forecasting unit 3 for the relevant load facility 1.

The storage/discharge device control unit 5 outputs a storage command or a discharge command to the storage/discharge device 6 based on the difference value obtained by the difference operation unit 4. Based on the storage command or the discharge command from the storage/discharge device control unit 5, the storage/discharge device 6 stores electricity from the power supply device or discharges (supplies) electricity to the load facility 1. More specifically, the storage/discharge device control unit 5 determines a storage command or a discharge command to output, based on whether the difference value obtained by the difference operation unit 4 is positive or negative.

A relationship between commands from the storage/discharge device control unit 5 to the storage/discharge device 6 and the difference value obtained by the difference operation unit 4 is indicated in FIG. 3. If the difference value obtained by the difference operation unit 4 is positive, that is, if the actual measured value provided by the power detection unit 2 is smaller than the forecasted value provided by the power forecasting unit 3, the storage/discharge device control unit 5 outputs a storage command to the storage/discharge device 6. On the other hand, if the difference value obtained by the difference operation unit 4 is negative, that is, if the actual measured value provided by the power detection unit 2 is larger than the forecasted value provided by the power forecasting unit 3, the storage/discharge device control unit 5 outputs a discharge command to the storage/discharge device 6. Here, if the difference value obtained by the difference operation unit 4 is zero, that is, if the actual measured value provided by the power detection unit 2 and the forecasted value provided by the power forecasting unit 3 are exactly equal to each other, the storage/discharge device control unit 5 outputs neither a storage command nor a discharge command.

Here, as described above, the storage/discharge device 6 is provided for each load facility group. Therefore, the output of a storage command or a discharge command by the storage/discharge device control unit 5 is also performed for each load facility group as a unit. In other words, based on a sum of the difference values obtained by the difference operation unit 4 for each load facility group, the storage/discharge device control unit 5, the control unit outputs a storage command or a discharge command to the storage/discharge device 6 for the relevant load facility group.

More specifically, for a certain load facility group, if a sum of the difference values obtained by the difference operation unit 4 for the respective load facilities 1 belonging to the load facility group is positive, the storage/discharge device control unit 5 outputs a storage command to the storage/discharge device 6 for the load facility group. In this case, for the load facility group, the electric power from the power supply device is used for driving of the respective load facilities 1 belonging to the load facility group and storage of electric power into the storage/discharge device 6 for the load facility group.

On the other hand, for a certain load facility group, if a sum of the difference values obtained by the difference operation unit 4 for the respective load facilities 1 belonging to the load facility group is negative, the storage/discharge device control unit 5 outputs a discharge command to the storage/discharge device 6 for the load facility group. In this case, the respective load facilities 1 belonging to the load facility group are driven by the electric power from the power supply device and electric power discharged from the storage/discharge device 6 for the load facility group.

If the difference value obtained by the difference operation unit 4 is positive, that is, if the actual measured value provided by the power detection unit 2 is smaller than the forecasted value provided by the power forecasting unit 3, this means that an instantaneous amount of electric power actually consumed by the load facility 1 is smaller than an instantaneous amount of electric power forecasted to be consumed by the load facility 1. Therefore, there is a surplus in electric power supplied from the power supply device, and the storage/discharge device control unit 5 outputs a storage command to store the surplus into the storage/discharge device 6.

On the other hand, if the difference value obtained by the difference operation unit 4 is negative, that is, if the actual measured value provided by the power detection unit 2 is larger than the forecasted value provided by the power forecasting unit 3, this means that an instantaneous amount of electric power actually consumed by the load facility 1 is larger than an instantaneous amount of electric power forecasted to be consumed by the load facility 1. Therefore, the electric power supplied from the power supply device may be insufficient, and thus, the storage/discharge device control unit 5 outputs a discharge command, whereby the insufficiency can be supplemented with the electric power from the storage/discharge device 6.

Here, where power consumption in a load facility 1 detected by the power detection unit 2 is negative, the load facility 1 is in a regenerative state. In other words, the load facility 1 is a state in which the load facility 1 consumes no electric power and generates regenerative electric power. In this case, regardless of the power consumption value forecasted by the power forecasting unit 3 for the load facility 1, the regenerative electric power from the load facility 1 can be stored as surplus electric power into the storage/discharge device 6. Therefore, if it is determined based on the actual measured value detected by the power detection unit 2 that the load facility 1 is in a regenerative state, the storage/discharge device control unit 5 outputs a storage command to the storage/discharge device 6. In this case, the storage/discharge device control unit 5 can be regarded as functioning as a regenerative energy control unit.

Results of the storage commands and the discharge commands output from the storage/discharge device control unit 5 to the storage/discharge device 6 are stored and accumulated in a storage unit 7. A content of information stored in the storage unit 7 can be viewed by displaying the content on a display unit 8. Here, the information stored in the storage unit 7 may include, in addition to the results of the storage commands and the discharge commands, e.g., the number of storage/discharge cycles in the storage/discharge device 6, and an estimate value of the life of the storage/discharge device 6 based on the number of storage/discharge cycles.

The display unit 8 may be configured so as to be able to display, in addition to the results of the storage commands and the discharge commands stored in the storage unit 7, information such as an actual measured value of instantaneous power consumption in the load facility 1, which has been detected by the power detection unit 2, a forecasted value of instantaneous power consumption in the load facility 1, which has been calculated by the power forecasting unit 3, a difference value between the actual measured value and the forecasted value, which has been obtained by the difference operation unit 4, and information on whether or not the load facility 1 is in regenerative operation (an amount of regenerative electric power if the load facility 1 is in regenerative operation). Also, the configurations may be made so that these pieces of information can be stored and accumulated in the storage unit and past history records can be displayed and viewed on the display unit 8.

The power management device according to the present embodiment includes a learning function unit 9 for enhancing a forecast accuracy of a power consumption amount for each load facility 1 in the power forecasting unit 3. The learning function unit 9 calculates, based on a difference value between an actual measured value from the power detection unit 2 and a forecasted value from the power forecasting unit 3, which has been calculated by the difference operation unit 4, a correction value α for the forecasted value so as to bring the forecasted value closer to the actual measured value.

The correction value α is calculated as a correction value for a forecasted value, enabling minimization of the sum of squares of difference values between actual measured values and forecasted values within a fixed period of time, by using, for example, the method of least squares. Here, the learning function unit 9 may be configured to minimize a parameter for a power consumption forecast algorithm used in the power forecasting unit 3 so that the difference value is minimized.

The correction value α calculated in the learning function unit 9 is transmitted to the power forecasting unit 3. Then, the power forecasting unit 3 performs subsequent power consumption forecast for each load facility 1 using the correction value α. As described above, learning results in the learning function unit 9 are reflected in the power forecasting unit 3. As a result of the correction value α calculated by the learning function unit 9 being reflected in the power forecasting unit 3 in such a manner as described above, the accuracy of forecast by the power forecasting unit 3 is enhanced, enabling decrease in deviation of a value forecasted by the power forecasting unit 3 from actual power consumption in the load facility 1.

Operation of the power management device for a load facility 1, which is configured as described above, will be described again with reference to FIG. 4.

First, in step S11 in FIG. 4, the power forecasting unit 3 calculates a forecasted value of instantaneous power consumption for the load facility 1, and transmits the calculated forecasted value. In next step S12, whether or not the calculation and transmission of the forecasted value in step S11 have normally been performed is confirmed. If the calculation and transmission of the forecasted value have not normally been performed, the operation returns to step S11 to recalculate the forecasted value or the operation proceeds to step S13 to perform abnormality processing and end the processing.

In parallel with steps S11 to S13 above, the power detection unit 2 detects an actual measured value of instantaneous power consumption in the load facility 1 in step S21, and transmits the detected actual measured value. In next step S22, whether or not the detection and transmission of the actual measured value in step S21 have normally been performed is confirmed. If the detection and transmission of the actual measured value have not normally been performed, the operation returns to step S21 to recalculate the forecasted value or the operation proceeds to step S23 to perform abnormality processing and end the processing.

If it is confirmed that the calculation and transmission of the forecasted value have normally been performed in step S12 and the calculation and transmission of the actual measured value have normally been performed in step S22, the operation proceeds to step S30. In step S30, the difference operation unit 4 performs an operation to obtain a difference value by subtracting the actual measured value transmitted by the power detection unit 2 from the forecasted value transmitted by the power forecasting unit 3.

In next step S31, the storage/discharge device control unit 5 evaluates the difference value obtained in step S30 to determine whether or not the difference value is larger than β or smaller than β. Here, β is a predetermined threshold value for determination, and β≥0. Here, β indicates a degree of deviation of a forecasted value from an actual measured value enough to store or discharge electricity to or from a storage/discharge device 6. As β is larger, the degree of allowed deviation (that is, neither storage nor discharge to or from the storage/discharge device 6 is performed) is larger. Note that the above-described operation of the storage/discharge device control unit 5 corresponds to that where β=0.

If it is determined in step S31 that the difference value is larger than β, the operation proceeds to step S32 and the storage/discharge device control unit 5 transmits a storage command. On the other hand, if it is determined in step S31 that the difference value is smaller than −β, the operation proceeds to step S33 and the storage/discharge device control unit 5 transmits a discharge command. Subsequent to step S32 or step S33, the operation proceeds to step S34. In step S34, whether or not the transmission of the storage command or the discharge command from the storage/discharge device control unit 5 has normally been performed is confirmed.

If the transmission of the storage command or the discharge command has normally been performed, the operation proceeds to step S35, the storage/discharge device 6 stores or discharges electricity according to the storage command or the discharge command. On the other hand, if the transmission of the storage command or the discharge command has not normally been performed, the operation returns to step S32 or step S33 to recalculate the storage command or the discharge command or the operation proceeds to step S36 to perform abnormality processing and end the processing.

The power management device configured as described above includes: the power detection unit 2, which is a detection unit that detects an instantaneous value of power consumption for each of a plurality of load facilities 1; the power forecasting unit 3, which is a forecasting unit that forecasts an instantaneous value of power consumption for each of the plurality of load facilities; the difference operation unit 4, which is an operation unit that performs an operation to obtain a difference between the value detected by the detection and the value forecasted by the forecasting unit for each of the plurality of load facilities; the storage/discharge device control unit 5, which is a control unit that outputs a storage command or a discharge command based on whether the difference obtained by the operation unit is positive or negative; and the storage/discharge device 6 that stores or discharges electricity based on the storage command or the discharge command output from the control unit.

Thus, when instantaneous power consumption change occurs for each of a plurality of load facilities and a forecasted value thereby deviates from an actual measured value, if there is a surplus in electric power supplied from the power supply device, the surplus can be stored in the storage/discharge device 6, and if there is insufficiency in electric power supplied from the power supply device, the insufficiency can be supplemented by electrical power discharge from the storage/discharge device 6.

Therefore, the power management device can properly respond to instantaneous and steep power consumption amount change in a load facility due to production condition change or occurrence of an abnormality during operation, enabling efficient use of electric power.

Also, the storage/discharge device control unit 5 is configured so as to, if it is determined based on the value detected by the power detection unit 2 that the load facility 1 is in a regenerative state, output a storage command to the storage/discharge device 6, whereby power consumption change when the load facility is in a regenerative state can be mitigated and generated regenerative electric power can effectively be used.

Furthermore, the storage/discharge device control unit 5 is configured so as to, based on whether a sum of differences in each load facility group is positive or negative, output a storage command or a discharge command to the storage/discharge device 6 for the load facility group, whereby determination of storage or discharge to perform can be made for a load facility group including a plurality of load facilities 1, as a unit, whereby power consumption change in each load facility 1 can be smoothed. Also, compared to a case where the load facilities 1 individually perform electricity storage/discharge, the number of storage/discharge cycles in the storage/discharge device 6 is reduced, which can contribute to extension of the life of the storage/discharge device 6.

In addition, the configuration is made so that various types of information such as results of storage commands and discharge commands output from the storage/discharge device control unit 5 is stored and accumulated in the storage unit 7 and a content of the information can be viewed on the display unit 8 as necessary, which is useful to, for example, upon occurrence of any abnormality or the like, perform ex-post analysis of the situation.

INDUSTRIAL APPLICABILITY

The present invention can be used for a power management device that manages electric power in a load facility group including a plurality of load facilities.

DESCRIPTION OF SYMBOLS 1 load facilities
2 power detection unit
3 power forecasting unit
4 difference operation unit
5 storage/discharge device control unit
6 storage/discharge device
7 storage unit
8 display unit
9 learning function unit
10 reheating furnace
11 reheating furnace motor
20 roughing mills
21 roughing mill motor
22 roughing mill drive device
30 crop shear
31 crop shear motor
40 finishing mills
41 finishing mill motor
42 finishing mill drive device
50 down coiler
51 down coiler motor
60 water pit
61 pump

The invention claimed is:

1. A power management device for managing electric power in a load facility group having a plurality of load facilities, the power management device comprising:
a detector configured to detect an instantaneous value of power consumption for each of the plurality of load facilities;
a forecasting device configured to calculate a forecast of an instantaneous value of power consumption for each of the plurality of load facilities by using a power consumption forecast algorithm including a parameter;
an operation device configured to perform an operation to obtain a difference between the value detected by the detector and the value forecasted by the forecasting device, for each of the plurality of load facilities;
a controller configured to output a storage command when the difference between the value detected by the detector and the value forecasted by the forecasting device is larger than a predetermined positive value $\beta$ and to output a discharge command when the difference between the value detected by the detector and the value forecasted by the forecasting device is smaller than $-\beta$, wherein $\beta$ indicates a degree of deviation of the forecasted value from the value detected by the detector enough to store or discharge electricity to or from a storage/discharge device; and
the storage/discharge device configured to store electricity when the storage command is output from the controller and to discharge electricity when the discharge command is output from the controller, wherein
the parameter for the power consumption forecast algorithm used in the forecasting device is a correction value obtained based on the difference between the value detected by the detector and the value forecasted by the forecasting device and is optimized such that the difference obtained by the operation device is minimized.

2. The power management device according to claim 1, wherein if it is determined based on the value detected by the detector that the load facility is in a regenerative state, the controller outputs the storage command.

3. The power management device according to claim 1, wherein:
a plurality of the load facility groups are provided;
the storage/discharge device is provided for each of the plurality of load facility groups; and
based on a sum of the differences for each of the load facility groups being larger than the predetermined positive value $\beta$, the controller outputs the storage command to the storage/discharge device for the respective load facility group, and based on a sum of the differences for each of the load facility groups being smaller than $-\beta$, the controller outputs the discharge command to the storage/discharge device for the respective load facility group.

4. The power management device according to claim 1, further comprising:
a storage configured to store results of the storage command and the discharge command output from the controller; and
a display configured to display the results of the storage command and the discharge command stored in the storage.

5. The power management device according to claim 4, wherein the display displays the difference obtained by the operation device.

6. The power management device according to claim 1, further comprising circuitry configured to calculate a correction value for the value forecasted by the forecasting device, based on the difference obtained by the operation device,
wherein the forecasting device forecasts an instantaneous value of power consumption for each of the plurality of load facilities, using the calculated correction value.

* * * * *